United States Patent
Hsu et al.

(10) Patent No.: US 8,026,022 B2
(45) Date of Patent: Sep. 27, 2011

(54) LONG-LENGTH FIBER BRAGG CREATING SEQUENTIAL UV WRITING BY PROBING PHASE MASK

(75) Inventors: Kuei-Chu Hsu, Tainan (TW); Yin-Chieh Lai, Taichung (TW); Chen-Wei Hsin, Changhua (TW)

(73) Assignee: National Chiao Tung University, Hsinchu (TW)

( * ) Notice: Subject to any disclaimer, the term of this patent is extended or adjusted under 35 U.S.C. 154(b) by 574 days.

(21) Appl. No.: 12/153,300

(22) Filed: May 16, 2008

(65) Prior Publication Data

US 2009/0208876 A1 Aug. 20, 2009

(30) Foreign Application Priority Data

Feb. 18, 2008 (TW) ................. 97105548 A

(51) Int. Cl.
*G03H 1/02* (2006.01)
*G03F 7/20* (2006.01)
(52) U.S. Cl. ................. 430/1; 430/2; 430/321
(58) Field of Classification Search .......... None
See application file for complete search history.

(56) References Cited

U.S. PATENT DOCUMENTS

| | | | |
|---|---|---|---|
| 5,637,868 A * | 6/1997 | Tamiya ............... | 250/237 G |
| 5,830,622 A | 11/1998 | Canning et al. | |
| 5,945,261 A | 8/1999 | Rourke | |
| 6,753,118 B2 | 6/2004 | Deshmukh et al. | |
| 6,801,689 B1 | 10/2004 | Sweetser et al. | |
| 6,813,079 B2 | 11/2004 | Laming et al. | |
| 6,834,977 B2 | 12/2004 | Suehiro et al. | |
| 7,382,951 B2 * | 6/2008 | Hsu et al. ................ | 385/37 |
| 2004/0257550 A1 * | 12/2004 | Kasumi ................ | 355/53 |
| 2007/0274633 A1 * | 11/2007 | Raub et al. ................ | 385/37 |

FOREIGN PATENT DOCUMENTS

TW 434431 5/2001

OTHER PUBLICATIONS

Hsu et al. "fiber Bragg grating sequential UV writing methods with real time interferometric side diffraction position monitoring", Opt Exp., vol. 13(10) pp. 3795-3801 (May 2005).*
Katureka et al., "Embeddable fiber optic sensors . . ." Proc. SPIE, vol. 4215 pp. 218-224 (2001).*
Gamet et al. "Flying phase mask for the printing of long submicron period stitchless gratings", Microelec. Eng., vol. 83 pp. 734-737 (on line Jan. 2006).*
Voirin et al., "Performance of interferometric rotation encoders . . .", Proc. SPIE 3099 pp. 166-175 (1997).*
Hsu et al., Fabrication of fiber bragg gratings by sequential UV writing with real time interferometric . . . Proc. ECOC We4.P.132 (2 pages) (2005).*

(Continued)

*Primary Examiner* — Martin Angebranndt
(74) *Attorney, Agent, or Firm* — Bacon & Thomas, PLLC

(57) ABSTRACT

A new fiber position monitoring method for sequential FBG UV-writing processes with a reference phase mask as the phase reference is proposed. Also, the new method by probing a reference phase mask can overcome the optical alignment difficulties in using reference fiber as well as provide more signal power for achieving better monitoring accuracy. Moreover, the present invention provides a method for sequentially joining a plurality of grating sections into a fiber grating longer than a phase mask.

8 Claims, 2 Drawing Sheets

OTHER PUBLICATIONS

Chuang et al., "interferometric side diffraction position monitoriing . . . ", Proc. CLEO-IQEC CThM6 (2 pages) (2004).*

Hsu et al. "Improved fiber bragg grating step scan exposure . . . ", Proc Op B-SU-VIII10-3 (3 pages) (2004).*

Cole, M. J. et al; Moving Fibre/phase Mask-Scanning Beam Technique for Enhanced Flexibility in Producing Fibre Gratings with Uniform Phase Mask; Electronic Letters, 17th Aug. 1995, pp. 1488-1490, vol. 31, No. 17.

Asseh, Adel et al.; A Writing Technique for Long Fiber Bragg Gratings with Complex Reflectivity Protiles, Journal of Lightwave Technology, Aug. 1997, pp. 1419-1423, vol. 15, No. 8.

Petermann, Ingemar et al.; Fabrication of Advanced Fiber Bragg Gratings by Use of Sequential Writing with a Continuous-Wave Ultraviolet Laser Source, Applied Optics, Feb. 20, 2002, pp. 1051-1056, vol. 41, No. 6, Optical Society of America.

\* cited by examiner

Solid line : Experimental scanned profile
Dot line : Designed profile of this invention

LONG-LENGTH FIBER BRAGG CREATING SEQUENTIAL UV WRITING BY PROBING PHASE MASK

BACKGROUND OF THE INVENTION

1. Technical Field

The present invention relates to a method for manufacturing a complicated fiber grating by probing a diffraction of a phase mask. More particularly, the present invention relates to a method for manufacturing a long-length fiber Bragg grating (FBG) having a complicated structure, and a method for manufacturing a sequentially joined fiber grating longer than a phase mask in order to reduce errors in manufacturing fiber gratings. The present invention further provides a method for sequentially joining a plurality of grating sections into a fiber grating longer than a phase mask.

2. Description of Related Art

In recent years, many methods have been proposed for manufacturing a long-length fiber grating having a complicated structure, including the moving fiber-scanning beam technique and the sequential writing technique. When these two techniques are applied to a UV writing process, a He—Ne laser interferometer is required to track the position of an optical fiber. However, while manufacturing a long-length fiber grating, an accumulative error in the fiber position may occur during exposure due to a drifting of fringes generated by the interferometer and an inaccurate estimation of grating periods. This error has great impact on the manufacturing process and adds to the difficulties in manufacturing fiber Bragg gratings having complicated refractive-index changes and phase shift structures.

A patent application was filed in Taiwan by the present inventors of a method for manufacturing a fiber Bragg grating (Taiwan Patent Application No. 094115916; filed on May 17, 2005), wherein a phase distribution of a reference fiber grating is probed before each overlapping UV exposure. In this method, a feedback system is employed to probe a phase distribution of the reference grating at each locating point, so that the phase distributions of the reference grating before and after the reference grating is moved can be controlled to be consistent, ensuring that a phase of each written grating section is continuous from a phase of a previous grating section. However, the reference grating has a very small fiber core radius and a low first-order diffraction efficiency, making it difficult to calibrate the accuracy of position monitoring.

Furthermore, it is known from numerical simulation results that, for a subsequent fiber grating to have a frequency spectrum of a desired quality, a period mismatch between a period of the grating used for position monitoring and a period of UV fringe writing must be smaller than 5%. For ease of contrast, the prior art techniques mentioned in the first paragraph of this section are summarized below in comparison with the present invention to demonstrate their respective pros and cons.

(1) Taiwan Patent No. 434431

According to the method of this patent, a light beam is used to directly write a grating into a moving waveguide. Without using a phase mask and the interference technique, the grating is written in a point-by-point manner, whose refractive index is changed along the waveguide solely by controlling a moving speed of the waveguide. This method is suitable only for a long-period fiber grating and not applicable to a short-period fiber Bragg grating.

(2) U.S. Pat. Nos. 6,834,977 and 6,813,079

In these two patented methods, a grating is written into an optical fiber through a phase mask, section by section, by exposure to a continuous UV writing beam in an overlapping manner. Besides, an interferometer is used to monitor a position of a translation stage at each locating point. However, using the interferometer to monitor a writing location on the optical fiber leads to an accumulative error and requires accurate calibration of a period of the UV writing beam in advance. In the present invention, a grating is sequentially written in a section-by-section manner by probing a phase of a reference fiber grating, wherein a standard phase distribution is provided as a reference for writing. Therefore, according to the present invention, there are no accumulative error-related problems, and the accuracy of period calibration does not influence the manufacturing process significantly.

(3) U.S. Pat. No. 5,945,261

In this patented method, which utilizes the principle that an optical fiber exposed to a UV light will produce a fluorescent light, a grating section is created in advance by UV exposure and, by probing an intensity of the fluorescent light as a feedback system, a position of a translation stage is adjusted according to the fluorescent reaction of this pre-exposed grating section, so that a very long grating can be sequentially formed without phase discontinuity. And yet this method does not allow arbitrary insertion of phase shifts. According to the present invention, however, an arbitrary phase shift can be easily added to any location.

(4) U.S. Pat. Nos. 6,753,118 and 6,801,689

In the methods of these two patents, a feedback system is provided to compensate for drawbacks associated with gratings written by section-by-section, overlapping exposures. More particularly, a spectral response of a written grating is used to calculate corrections. However, as it is difficult to perform real-time monitoring with these methods, they are more suitable for regenerating written gratings. In contrast, the present invention allows real-time adjustment of phase distributions at each locating point, so that a grating can be completely created by writing with a UV writing beam only once.

(5) U.S. Pat. No. 5,830,622

In this patented method, refractive indices are adjusted by additional UV exposures at predetermined locations to introduce additional phase shifts. Therefore, scanning must be conducted for a second time, which is rather time consuming. In addition, the desired phase shifts to be introduced are hard to obtain in a section-by-section manner. In the present invention, however, an arbitrary phase shift can be easily added to any location without additional UV exposures.

(6) Paper published in *Electronics Letters* (1995), p. 1490

In this paper, grating writing is performed with a moving optical fiber and a phase mask. A fiber grating created by this method is limited in length by a length of the phase mask, while a resolution of a written pattern is affected by a limit on a moving speed of the optical fiber. In contrast, in the present invention, a grating is sequentially written in a section-by-section manner by probing a phase of a reference fiber grating. Therefore, the grating is not limited in length by a phase mask while a resolution of a written pattern is controlled by a writing time.

(7) Paper published in *Journal of Lightwave Technology* (1997), p. 1419

In this paper, a grating is also written by overlapping exposures in a section-by-section manner while an interferometer monitors a position of a translation stage at each locating point. However, a UV pulse is used in this paper as a writing beam, and a pulse laser causes additional noise problems. The present invention causes no such problems because a grating is sequentially created in a section-by-section manner by switching on and off a continuous UV writing beam.

(8) Paper published in *Applied Optics* (2002), p. 1051

In this paper, a grating is also written by overlapping exposures in a section-by-section manner while an interferometer monitors a position of a translation stage at each locating point. Although a continuous UV beam is used as a writing beam, the technique of using the interferometer to monitor a writing location on an optical fiber results in an accumulative error, which requires calibrating a period of the writing beam in advance. In contrast, according to the present invention, a grating is sequentially created in a section-by-section manner by probing a phase of a reference fiber grating, so that there are no accumulative error-related problems.

BRIEF SUMMARY OF THE INVENTION

In summary, in view of the fact that a phase mask designed for use in writing a fiber grating with a UV writing beam provides such advantages as having a high period accuracy, a high diffraction efficiency, ease of optical calibration and a period which is an integer number of times as long as a period of a written fiber grating thereby, the present invention aims to provide further improvement therein. In order to overcome the shortcomings and defects of prior art techniques, the present invention provides a method for writing a grating, wherein a position of an optical fiber is monitored by probing a reference phase mask whose period is an integer number of times as long as a period of a UV fringe so as to ensure phase continuity. The present invention also achieves a higher calibration accuracy in position monitoring because a phase mask has a much higher first-order diffraction efficiency than those of previously proposed reference fiber Bragg grating elements and allows optical calibration to be conducted more easily.

Moreover, it is known from numerical simulation results that a grating will achieve a desired quality only when a period mismatch between a period of position monitoring and a period of sequential UV writing is smaller than 5%. Since a phase mask has a very high accuracy when shipped from the factory, the phase mask itself has a minimum error. On the contrary, a conventional reference fiber Bragg grating element is manufactured in a conventional manufacturing system, so it is inevitable for the reference grating itself to have accumulated errors. In contrast, a phase mask having a minimum error of itself can reduce errors in grating manufacture and thereby increase production yield.

The present invention has two main objectives. A first objective is to provide a method for manufacturing a long-length fiber Bragg grating having a complicated structure, which method comprises steps of:

(1) Aligning a reference phase mask in parallel with an optical fiber to be exposed, wherein the reference phase mask has a period which is an integer number of times as long as a period of a UV fringe to be written;

(2) Projecting a probe beam into the reference phase mask along a normal direction thereof each time when a locating point for an overlapping UV exposure is to be determined, so as to generate a first-order Bragg diffraction beam, which interferes with a reference beam to generate a fringe; and using a feedback system to compare phase distributions of the fringe before and after a translation stage is moved, so as to fine-tune a final position of the translation stage for this locating point until the phase distributions are within a given error range, wherein an image recording device, such as a charge-coupled device (CCD), is used to observe the fringe;

(3) Turning on a UV exposure switch to provide UV exposure and turning off the UV exposure switch after a given time; and (4) Translating the translation stage to a next locating point and repeating the steps (1) to (3).

A second objective of the present invention is to provide a method for manufacturing a sequentially joined fiber grating longer than a phase mask, which method comprises steps of:

(1) Aligning a reference phase mask in parallel with an optical fiber to be exposed, wherein the reference phase mask has a period which is an integer number of times as long as a period of a UV fringe to be written;

(2) Projecting a first probe beam and a second probe beam into the reference phase mask along a normal direction thereof at two ends of the reference phase mask, respectively, so as to generate respective first-order diffraction beams, which interfere with a first reference beam and a second reference beam, respectively, to generate fringes on two image recording devices (such as CCDs) (i.e. an image recording device A and an image recording device B), respectively;

(3) Using the fringe on the image recording device A for phase analysis and real-time position monitoring each time when a locating point for an overlapping UV exposure is to be determined, thereby joining each of a plurality of grating sections sequentially; and (4) Calibrating a phase shift between the fringe on the image recording device A and the fringe on the image recording device B and recording the phase shift as Δθ until the first probe beam is relatively translated to the other of the two ends of the reference phase mask; and afterwards using the fringe on the image recording device B for phase analysis and real-time position monitoring, thereby joining each of a plurality of grating sections sequentially, wherein Δθ is added to each said grating section as an additional phase shift.

BRIEF DESCRIPTION OF THE SEVERAL VIEWS OF THE DRAWINGS

The invention as well as a preferred mode of use, further objectives and advantages thereof, will best be understood by reference to the following detailed description of illustrative embodiments when read in conjunction with the accompanying drawings, wherein.

DETAILED DESCRIPTION OF THE INVENTION

Figure 1:
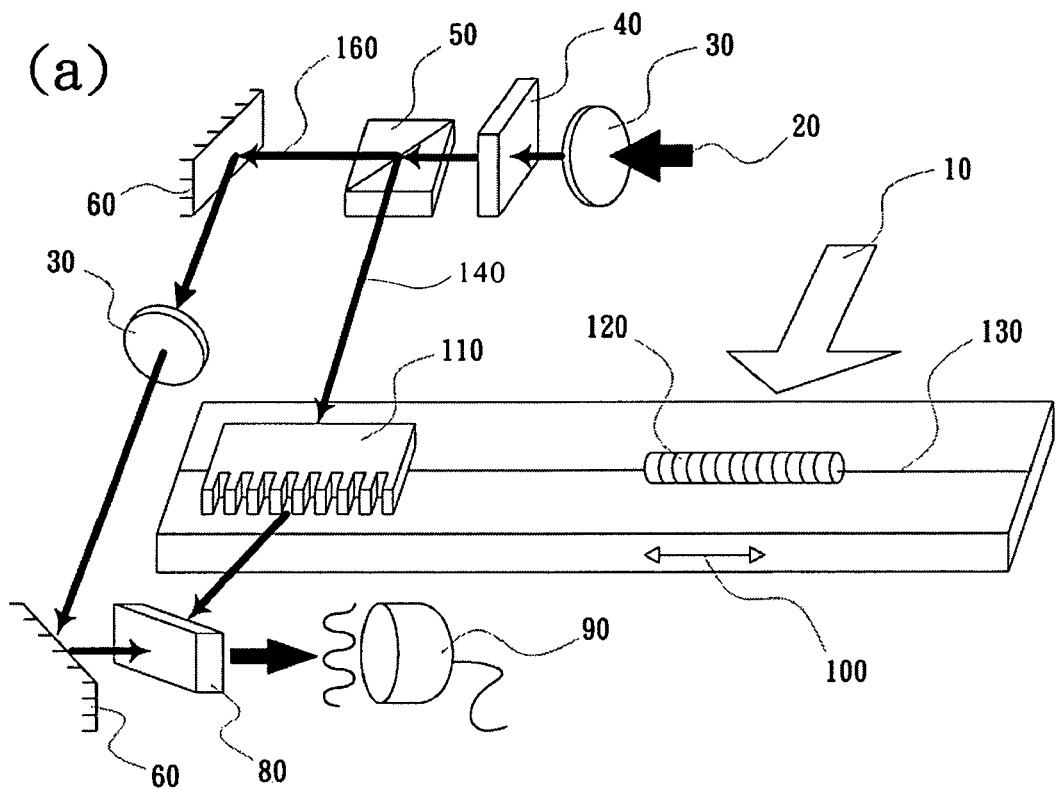
FIG. 1(A) is a schematic drawing showing a structure for real-time position monitoring by probing a reference phase mask with an interference technique.
FIG. 1(B) shows a distribution of modulated refractive indices of a fiber grating experimentally formed by joining grating sections sequentially using the method shown in FIG. 1(A)
Figure 1:
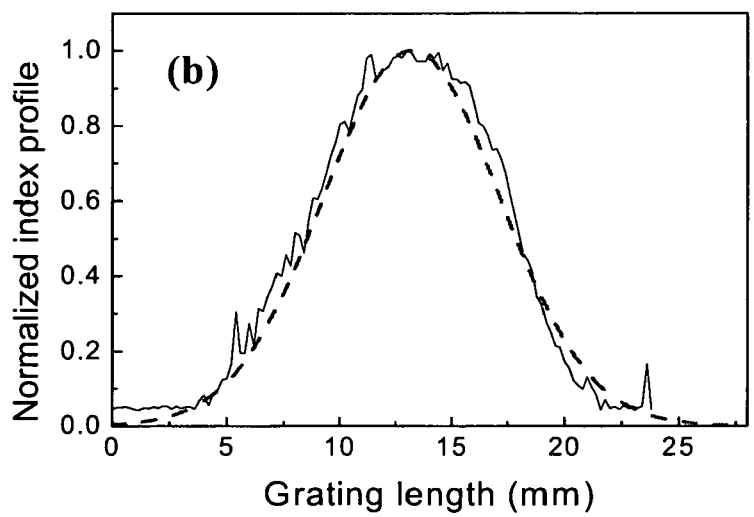

Two preferred embodiments of the present invention will be described below with reference to the appended drawings so that a person of ordinary skill in the art can fully appreciate the spirit of the present invention and carry out the present invention. In order to understand a method for manufacturing a long-length fiber Bragg grating having a complicated structure according to a first preferred embodiment of the present invention, please refer to FIG. 1(A) for a schematic drawing showing a structure for real-time position monitoring by probing a reference phase mask 110 with an interference technique. As shown in FIG. 1(A), the structure comprises a UV writing beam (244 nm) 10, a He—Ne laser probe beam (632.8 nm) 20, polarizers 30, a half-wave plate (HWP) 40, a polarizing beam splitter (PBS) 50, reflecting mirrors 60, a semi-reflecting semi-transmitting beam combiner (BC) 80, an image recording device (such as a CCD) 90, a translation stage 100, a reference phase mask 110, a UV fringe 120, an optical fiber 130, a first probe beam 140, and a reference beam 160. FIG. 1(A) mainly illustrates that the reference phase mask 110 for probing and the optical fiber 130 to be exposed are mounted together on the translation stage 100. According to simulation results of the aforementioned elements, a grating can achieve a desired quality only when a period mismatch between a period of the reference phase mask 110, which serves a position-monitoring grating, and a period of sequential writing by the UV writing beam 10 is smaller than 5%, wherein the period of the reference phase mask 110 is 1.07 μm, almost exactly twice as long as a period of a grating to be written in the optical fiber 130 by UV exposure. The reference phase mask 110, which serves as the position-monitoring grating, functions in the following way. When the He—Ne laser probe beam 20 is projected into the reference phase mask 110, a signal processing technique is used to generate an interferometric phase information regarding a present location of the reference phase mask 110. This interferometric phase information, in turn, can be used to calculate backwards to obtain a location information having a nanoscale accuracy. The reference phase mask 110 has a first-order diffraction efficiency of 21.2% with respect to the He—Ne laser probe beam (633 nm) 20. In addition, an optical calibration can be very easily conducted on the reference phase mask 110, making the reference phase mask 110 highly suitable for use in position monitoring. According to the present invention, the photosensitive optical fiber 130 is exposed to the UV fringe 120, which has a Gaussian waveform, a wavelength of 244 nm and a $1/e^2$ beam width of 6.4 mm, after the optical fiber 130 is pretreated with a UV light to ensure that changes in a refractive index of the optical fiber 130 are in linear proportion to an amount of the UV writing beam 10. According to the present invention, the UV writing beam (244 nm) 10 is projected onto the photosensitive optical fiber 130 section by section in a partly overlapping manner while the translation stage 100 is moved step by step within a long distance. In addition, the UV writing beam 10 writes at a constant spacing of 0.8 mm, so that an average refractive index remains constant, although a modulated quantity of the refractive index is arbitrary modulated according to the UV fringe profile. In the present invention, a plurality of Gaussian-shaped grating sections are joined in a partly overlapping manner to form a fiber Bragg grating having a length of approximately 2 cm, wherein a structure of the written grating is probed using a lateral diffraction technique.

Specifically, the method for manufacturing a long-length fiber Bragg grating having a complicated structure according to the first preferred embodiment of the present invention comprises steps of:

(1) Aligning the reference phase mask 110 in parallel with the optical fiber 130 to be exposed, wherein the period of the reference phase mask 110 is an integer number of times as long as the period of the UV fringe 120 to be written;

(2) Projecting the Ne—Ne laser probe beam 20 and thereby generating the first probe beam 140 that enters the reference phase mask 110 along a normal direction thereof each time when a locating point for an overlapping exposure by the UV writing beam 10 is to be determined, so as to generate a first-order Bragg diffraction beam, which interferes with the reference beam 160 to generate a fringe on the image recording device 90; and using a feedback system (not shown) to compare phase distributions of the fringe before and after the translation stage 100 is moved, so as to fine-tune a final position of the translation stage 100 for this locating point until the phase distributions are within a given error range;

(3) Turning on a switch of the UV writing beam 10 to provide a UV exposure and turning the switch off after a given time; and (4) Translating the translation stage 100 to a next locating point and repeating the steps (1) to (3).

FIG. 1(B) shows a distribution of modulated refractive indices of a fiber grating experimentally formed by joining grating sections sequentially using the method shown in FIG. 1(A), wherein measurements from the experiment are compared with design values for the structure of the written grating. More particularly, FIG. 1(B) shows a curve representing changes in refractive indices along a core of the optical fiber 130 measured with the lateral diffraction technique, and the curve is very similar to the desired Gaussian shape. The experiment result has shown that the method according to the first preferred embodiment of the present invention is very practical in manufacturing a fiber grating having a complicated structure, and also proved the feasibility of the method.

Figure 2:
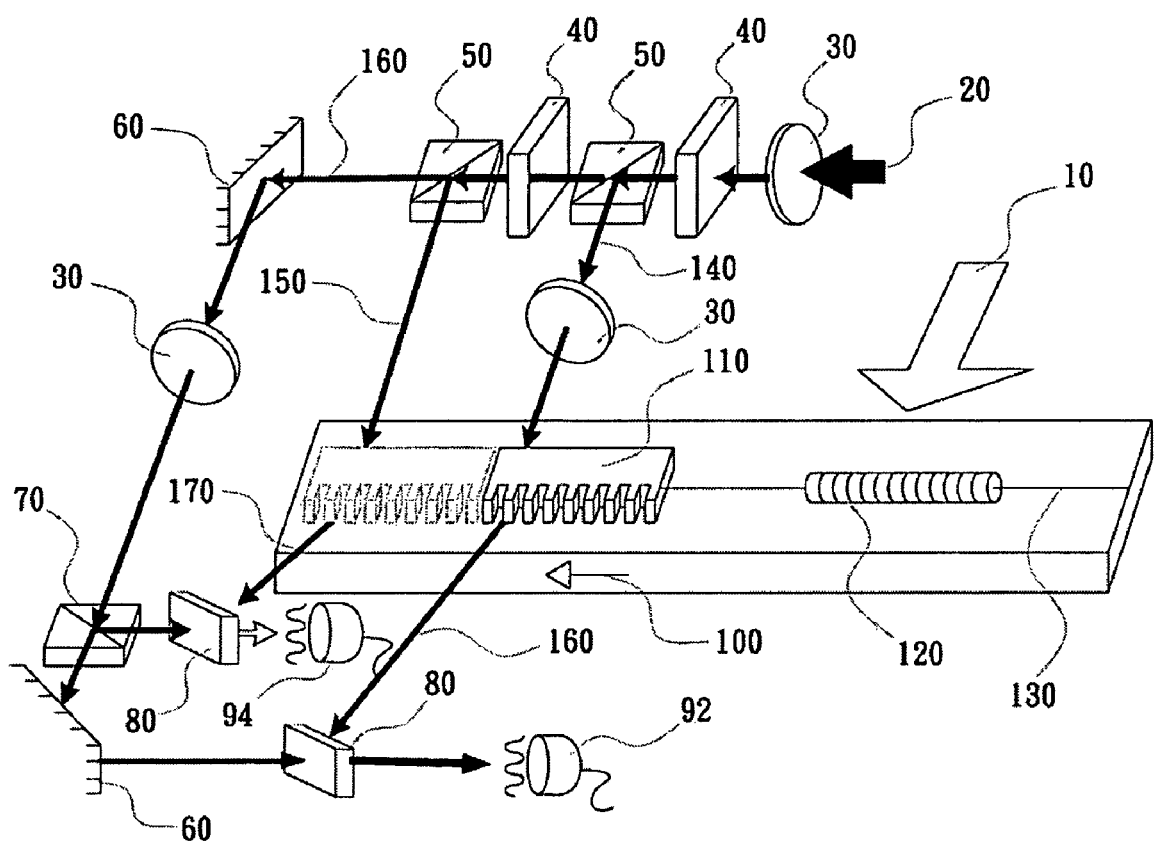
FIG. 2 is a schematic drawing showing a structure for sequentially joining a plurality of grating sections into a fiber grating longer than a phase mask.

The present invention further provides as a second preferred embodiment thereof a method for manufacturing a sequentially joined fiber grating longer than a phase mask. Refer to FIG. 2 for an experimental structure of the second preferred embodiment of the present invention, wherein the structure comprises a UV writing beam (244 nm) 10, a He—Ne laser probe beam (632.8 nm) 20, polarizers 30, half-wave plates (HWPs) 40, polarizing beam splitters (PBSs) 50, reflecting mirrors 60, a beam splitter (BS) 70, semi-reflecting semi-transmitting beam combiners (BCs) 80, an image recording device A (such as a CCD) 92, an image recording device B 94, a translation stage 100, a reference phase mask 110, a UV fringe 120, an optical fiber 130, a first probe beam 140, a second probe beam 150, a first reference beam 160 and a second reference beam 170. In FIG. 2, the reference phase mask 110 is aligned in parallel with the optical fiber 130 to be exposed, wherein the reference phase mask 110 has a period which is an integer number of times as long as a period of the UV fringe 120 to be written. The first probe beam 140 and the second probe beam 150 are projected into the reference phase mask 110 along a normal direction thereof at two ends of the reference phase mask 110, respectively, so as to simultaneously generate respective first-order diffraction beams, which interfere with the first reference beam 160 and the second reference beam 170, respectively, to generate fringes on the image recording device A 92 and the image recording device B 94, respectively, wherein the image recording device A 92 and the image recording device B 94 as well as the aforementioned image recording device 90 are all charge-coupled devices. Moving the stage until the first probe beam is locate at another end of the phase mask, and the fringe on the image recording device A 92 is used for phase analysis and real-time position monitoring each time when a locating point for an overlapping exposure by the UV writing beam 10 is to be determined, so as to join each of a plurality of grating sections sequentially. A phase shift between the fringe on the image recording device A 92 and the fringe on the image recording device B 94 is calibrated and recorded as Δθ when the first probe beams 140 is relatively translated to the other of the two ends of the reference phase mask 110. Afterwards, the fringe on the image recording device B 94 resulting from the second probe beam 150 and the second reference beam 170 is used for phase analysis and real-time position monitoring, so as to join each of a plurality of grating sections sequentially, wherein Δθ is added to each said grating section as an additional phase shift. Thus, a sequentially joined fiber grating longer than a phase mask is created.

The invention claimed is:

1. A method for manufacturing a sequentially joined fiber grating longer than a phase mask, comprising steps of:
   (1) aligning a reference phase mask in parallel with an photosensititve optical fiber to be exposed, wherein the reference phase mask has a period which is an integer number of times as long as a period of a UV fringe to be written, and forming a grating section on the photosensitive optical fiber by using a UV interferometric exposure;
   (2) producing a first probe beam and a second probe beam having a defined relationship by dividing an original probe beam, and projecting the first probe beam and the second probe beam into the reference phase mask along a normal direction thereof at two ends of the reference phase mask, respectively, so as to generate respective first-order diffraction beams simultaneously, which interfere with a first reference beam and a second reference beam, respectively, to generate fringes on a first image recording device and a second image recording device, respectively;
   (3) moving the stage so that the fiber and the grating are moved together and repeating steps (1) and (2) to form a plurality of grating sections, and joining each of the plurality of the grating sections sequentially with a desired phase shift;
   (4) moving the stage until the first probe beam is located at another end of the phase mask, and using the fringe on the first image recording device for phase analysis and real-time position monitoring each time when a locating point for an overlapping UV exposure is to be determined; and
   (5) determining and calibrating a phase shift $\Delta\theta$ between the fringe on the first image recording device and the fringe on the second image recording device when the first probe beam is relatively translated to the other end of the reference phase mask and two first-order diffraction beams are generated simultaneously; and afterwards using the fringe on the second image recording device resulting from the second probe beam and the second reference beam for phase analysis and real-time position monitoring, thereby joining each of the plurality of grating sections sequentially, wherein the recorded phase shift $\Delta\theta$ is added to each said grating section as an additional phase shift.

2. The method as claimed in claim 1, wherein the first probe beam, the second probe beam, the first reference beam and the second reference beam are laser beams whose wavelengths cannot be absorbed by the optical fibers.

3. The method as claimed in claim 2, wherein the reference phase mask has a first-order diffraction efficiency with respect to the first and second probe beams, which are the He—Ne laser beams having wavelengths of 633 nm, high enough to produce a clear fringe on the first and the second image recording devices of approximately 21.2%.

4. The method as claimed in claim 1, wherein e.g., the period of the reference phase mask is 1.07 μm while the period of the UV fringe is 0.535 μm.

5. The method as claimed in claim 1, wherein the UV fringe to which the optical fiber is exposed is a laser source having a continuous wave whose wavelength is 244 nm and whose waveform is Gaussian-shaped.

6. The method as claimed in claim 1, wherein the optical fiber is exposed section by section in a partly overlapping manner to a UV writing beam having a wavelength of 244 nm while the translation stage is moved step by step within a long distance, in which the UV writing beam writes at a constant spacing smaller than a $1/e^2$ beam width of the UV writing beam; wherein the UV dose at every grating section is fixed, and the UV fringe strength is varied so that an average refractive index remains constant while the index modulation can achieve arbitrary profile.

7. The method as claimed in claim 1, wherein the first and second image recording devices are charge-coupled devices.

8. The method as claimed in claim 1, further comprising a step of turning on a UV exposure switch to provide the UV exposure and turning off the UV exposure switch after a given time.

* * * * *